US010069718B2

(12) United States Patent
Khemani et al.

(10) Patent No.: US 10,069,718 B2
(45) Date of Patent: Sep. 4, 2018

(54) SWITCHING OF HOST NETWORK TRAFFIC THROUGH BASEBOARD MANAGEMENT CONTROLLER (BMC)

(71) Applicant: Dell Products, L.P., Round Rock, TX (US)

(72) Inventors: Lucky Pratap Khemani, Bangalore (IN); S. Sudarshan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 99 days.

(21) Appl. No.: 14/952,960

(22) Filed: Nov. 26, 2015

(65) Prior Publication Data
US 2017/0155573 A1      Jun. 1, 2017

(51) Int. Cl.
| H04L 25/00 | (2006.01) |
| H04L 12/707 | (2013.01) |
| H04L 29/14 | (2006.01) |
| H04L 12/703 | (2013.01) |
| H04L 12/24 | (2006.01) |
| H04B 1/30 | (2006.01) |
| G06F 13/42 | (2006.01) |

(52) U.S. Cl.
CPC .............. *H04L 45/22* (2013.01); *H04L 25/00* (2013.01); *H04L 41/0663* (2013.01); *H04L 45/28* (2013.01); *H04L 69/40* (2013.01); *G06F 13/4221* (2013.01); *H04B 1/302* (2013.01); *H04L 41/0816* (2013.01)

(58) Field of Classification Search
CPC . G06F 13/4221; H04L 41/0654; H04L 45/22; H04L 45/28; H04L 69/40; H04L 25/00; H04B 1/302
See application file for complete search history.

(56) References Cited

U.S. PATENT DOCUMENTS

| 9,542,195 | B1 * | 1/2017 | Astarabadi | G06F 9/4411 |
| 2011/0019225 | A1 * | 1/2011 | Jung | B41J 29/393 358/1.15 |
| 2012/0215917 | A1 * | 8/2012 | Ramamurthy | G06F 11/0712 709/224 |
| 2014/0165183 | A1 * | 6/2014 | Dharmadhikari | H04L 63/0227 726/13 |
| 2014/0269265 | A1 * | 9/2014 | Cheng | H04L 45/22 370/228 |
| 2016/0323148 | A1 * | 11/2016 | Butcher | H04L 41/04 |
| 2017/0102888 | A1 * | 4/2017 | Lobo | G06F 3/0619 |

\* cited by examiner

*Primary Examiner* — Salvador E Rivas
(74) *Attorney, Agent, or Firm* — Fogarty LLP

(57) ABSTRACT

Systems and methods for switching host network traffic through a Baseboard Management Controller (BMC) are described herein. In an illustrative, non-limiting embodiment, an Information Handling System (IHS) may include a host processor; a Baseband Management Controller (BMC) coupled to the host processor; and a memory coupled to the host processor, the memory having program instructions stored thereon that, upon execution, cause the IHS to: determine that a network path dedicated to the host processor has failed; and route host network traffic to and from the host processor through a network failover path provided by the BMC.

16 Claims, 4 Drawing Sheets

SWITCHING OF HOST NETWORK TRAFFIC THROUGH BASEBOARD MANAGEMENT CONTROLLER (BMC)

FIELD

This disclosure relates generally to Information Handling Systems (IHSs), and more specifically, to systems and methods for switching host network traffic through a Baseboard Management Controller (BMC).

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and/or networking systems.

Fault-tolerant IHSs provide network connection redundancy by designating a primary Network Interface Card (NIC) and utilizing a secondary NIC as backup; both NICs dedicated to communications performed by a host processor within the IHS. When the primary NIC loses its link (e.g., becomes inoperable), the IHS's host network interface will fail over the host processor's network traffic to the secondary or backup NIC. Accordingly, in these conventional systems, it is necessary that a standby or redundant NIC be dedicated to the host processor.

The inventors hereof have recognized, however, that this additional hardware (that is, the dedicated or secondary NIC) presents a cost burden to end-customers.

SUMMARY

Embodiments of systems and methods for switching host network traffic through a Baseboard Management Controller (BMC) are described herein. In an illustrative, non-limiting embodiment, an Information Handling System (IHS) may include a host processor; a Baseband Management Controller (BMC) coupled to the host processor; and a memory coupled to the host processor, the memory having program instructions stored thereon that, upon execution, cause the IHS to: determine that a network path dedicated to the host processor has failed; and route host network traffic to and from the host processor through a network failover path provided by the BMC.

The network path may be provided by a network device that includes a Network Interface Card (NIC) or a Local Area Network (LAN)-on-Motherboard (LOM) device coupled to the host processor. Determining that the network device has failed may include determining that an Ethernet controller has failed. The BMC may also be configured to receive network configuration data from the network device via a sideband channel upon detection of a configuration change or upon request by the BMC.

For example, the network failover path may include a secondary Reduced Gigabit Media-Independent Interface (RGMII) of the BMC. Additionally or alternatively, the network failover path may include a standby Ethernet Media Access Control (MAC) address of the BMC.

Moreover, the routing may be at least in part performed via a switching device distinct from the host processor and BMC. For instance, the switching device may include a Field-Programmable Gate Array (FPGA) coupled to the host processor and to the BMC via a General-Purpose Input/Output (GPIO) port. The BMC may be configured to take charge of the host network traffic after receiving a GPIO trigger from the FPGA. The BMC may also be configured to transfer host network traffic between the host processor and the network failover path via a Peripheral Component Interconnect Express (PCIe) bus.

The host processor may be configured to use a PCIe endpoint instead of a dedicated network port after receiving another GPIO trigger from the FPGA. The HIS may be also configured to determine that another network path dedicated to the BMC has failed, and route management network traffic to and from the BMC through the same network failover path.

In another illustrative, non-limiting embodiment, in an IHS having a host processor, a BMC coupled to the host processor, and an FPGA coupled to the host processor and to the BMC, a method may include: determining, by the FPGA, that a network path dedicated to the host processor has failed; and routing host network traffic to and from the host processor through a network failover path provided by the BMC.

The host network path may be provided by a network device dedicated to the host processor, and the BMC may be configured to receive network configuration data from the network device via a sideband channel upon detection of a configuration change or upon period request by the BMC. The BMC may be configured to take charge of the host network traffic after receiving a GPIO trigger from the FPGA, and the host processor may be configured to use a PCIe endpoint instead of a dedicated network port after receiving another GPIO trigger from the FPGA. The BMC may be configured to transfer host network traffic between the host processor and the network failover path via a PCIe bus.

In yet another illustrative, non-limiting embodiment, a memory device may have program instructions stored thereon that, upon execution by an IHS having a BMC and an FPGA coupled thereto, cause the IHS to: determine, by the FPGA, that a network path dedicated to the host processor has failed; and route host network traffic to and from the host processor through a network failover path provided by the BMC.

The host network path may be provided by a network device dedicated to the host processor, and the BMC may be configured to receive network configuration data from the network device via a sideband channel upon detection of a configuration change or upon period request by the BMC. The BMC may be configured to take charge of the host network traffic after receiving a GPIO trigger from the FPGA, and the host processor may be configured to use a PCIe endpoint instead of a dedicated network port after receiving another GPIO trigger from the FPGA. The BMC may be configured to transfer host network traffic between the host processor and the network failover path via a PCIe bus.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In the following detailed description of embodiments of the disclosure, specific embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, component, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
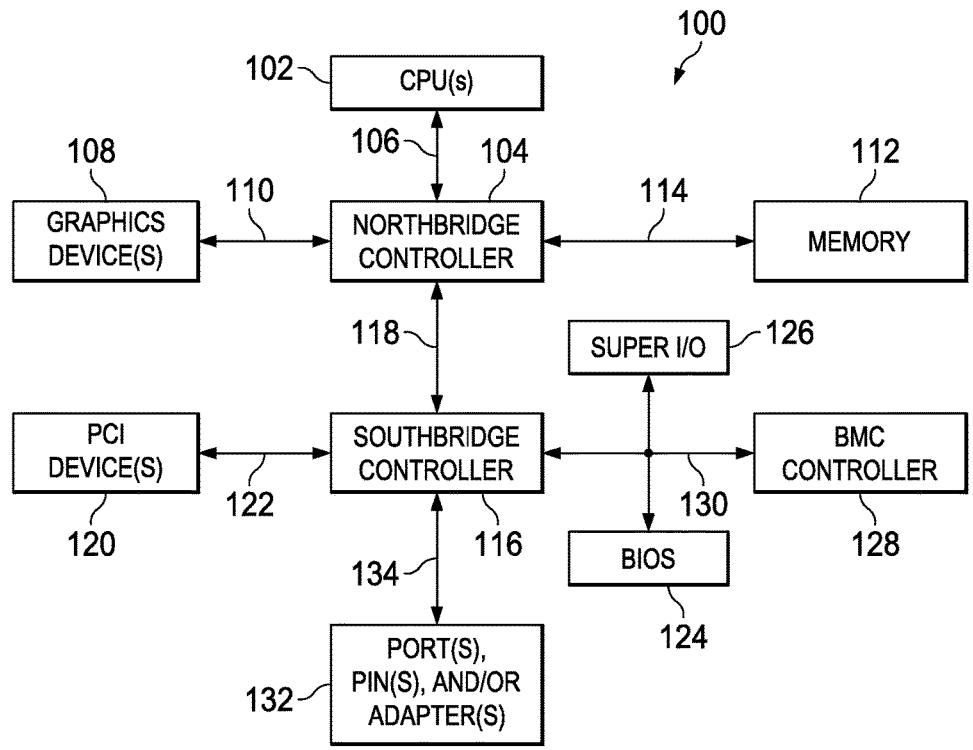
FIG. 1 is a block diagram illustrating an example of an Information Handling System (IHS) configured to implement systems and methods described herein, according to some embodiments.

FIG. 1 is a block diagram illustrating an example of an IHS configured to switch host network traffic through a Baseboard Management Controller (BMC) according to some embodiments. As shown, IHS 100 includes one or more CPUs or host processors 102. In various embodiments, IHS 100 may be a single-processor system including one CPU or host processor 102, or a multi-processor system including two or more CPUs or host processors 102 (e.g., two, four, eight, or any other suitable number). CPU(s) or host processor(s) 102 may include any processor capable of executing program instructions. For example, in various embodiments, CPU(s) or host processor(s) 102 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) or host processor(s) 102 may commonly, but not necessarily, implement the same ISA. In an embodiment, a motherboard configured to provide structural support, power, and electrical connectivity between the various aforementioned components. Such a motherboard may include multiple connector sockets in various configurations, adapted to receive pluggable circuit cards, component chip packages, etc.

CPU(s) or host processor(s) 102 are coupled to northbridge controller or chipset 104 via front-side bus 106. Northbridge controller 104 may be configured to coordinate I/O traffic between CPU(s) or host processor(s) 102 and other components. For example, in this particular implementation, northbridge controller 104 is coupled to graphics device(s) 108 (e.g., one or more video cards, controllers, or adaptors, etc.) via graphics bus 110 (e.g., an Accelerated Graphics Port or AGP bus, a Peripheral Component Interconnect or PCI bus, etc.). Northbridge controller 104 is also coupled to system memory 112 via memory bus 114. Memory 112 may be configured to store program instructions and/or data accessible by CPU(s) or host processor(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 is coupled to southbridge controller or chipset 116 via internal bus 118. Generally, southbridge controller 116 may be configured to handle various of IHS 100's I/O operations, and it may provide interfaces such as, for instance, Universal Serial (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other device suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 is further coupled to one or more PCI devices 120 (e.g., network cards, sound cards, video cards, etc.) via PCI bus 122. Southbridge controller 116 is also coupled to Basic Input/Output System (BIOS) or Unified Extensible Firmware Interface (UEFI) firmware 124, Super I/O Controller 126, and Baseband Management Controller (BMC) 128 via Low Pin Count (LPC) bus 130.

BIOS/UEFI 124 includes non-volatile memory having program instructions stored thereon. Those instructions may be usable CPU(s) or host processor(s) 102 to initialize and test other hardware components and/or to load an Operating System (OS) onto IHS 100. As such, BIOS/UEFI 124 may include a firmware interface that allows CPU(s) or host processor(s) 102 to load and execute certain operations.

BMC controller 128 may include non-volatile memory having program instructions stored thereon that are usable by CPU(s) or host processor(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS/UEFI's interface to initialize and test components of IHS 100.

In many implementations, BIOS/UEFI 124 and/or BMC controller 128 may operate prior to the booting of the OS (e.g., in response to a power-up or reset command), and may provide a pre-boot GUI to enable interactions between the user and IHS 100 before the OS is executed. Super I/O Controller 126 combines interfaces for a variety of lower bandwidth or low data rate devices. Those devices may include, for example, floppy disks, parallel ports, keyboard and mouse, temperature sensor and fan speed monitoring, etc.

In some cases, IHS 100 may be configured to access different types of computer-accessible media separate from memory 112. Generally speaking, a computer-accessible memory device may include any tangible, non-transitory storage media or memory media such as electronic, magnetic, or optical media—e.g., magnetic disk, a hard drive, a CD/DVD-ROM, a Flash memory, etc.—coupled to IHS 100 via northbridge controller 104 and/or southbridge controller 116.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of physical storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following an Intel® architecture, various systems and methods described herein may be adapted to work with any other chipset and/or BMC configuration.

In addition, the operations performed by the illustrated components may, in some embodiments, be performed by fewer components or distributed across additional components. Similarly, in other embodiments, the operations of some of the illustrated components may not be performed and/or other additional operations may be available.

For example, northbridge controller 104 may be combined with southbridge controller 116, and/or be at least partially incorporated into CPU(s) or host processor(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be enclosed within a chassis or the like.

A person of ordinary skill in the art will recognize that IHS 100 of FIG. 1 is only an example of a system in which the present embodiments may be utilized. Indeed, the present embodiments may be used in various other types of electronic devices.

Figure 2:
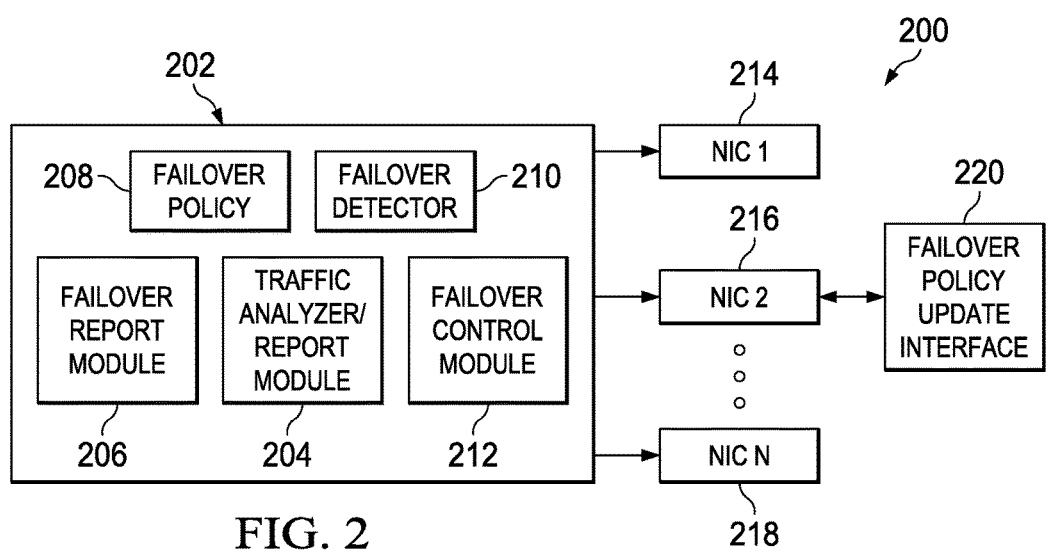
FIG. 2 is a block diagram of an example of a network traffic monitor and control system, according to some embodiments.

In various implementations, CPU or host processor 102 may have fault-tolerant network capabilities by including a failover management system that allow a failed network connection to be substituted for an operational network connection. FIG. 2 illustrates a block diagram of failover management system 200 that can include a network traffic detection and control module 202, network traffic analyzer and report module 204, failover report module 206, failover policy 208, fault detector 210, and failover control module 212.

In general, failover management system 200 may be implemented in part within CPU or host processor 102, BMC 128, and/or within an FPGA, as described in more detail below. As shown, network traffic and control module 202 is coupled to first NIC 214, second NIC 216, and $n^{th}$ NIC 218. For instance, in some cases NICs 214-218 may be implemented as PCI devices 120 (or USB devices, etc.) and/or network adapter 132.

Failover management system 200 may further include failover policy update interface 220 that can access the network traffic detection and control module 202 to update and set failover policy 208. Failover policy update interface 220 may be used in association with management control interface, network administrator application or interface, a custom application made available to a customer, or any other type of user interface that can allow access to failover policy 208.

In some implementations, a user may create a failover policy from a remote system and update multiple systems including a failover policy source. In this manner, specific types of policies can be established to ensure that specific types of network traffic can be prioritized. Additionally, users that may have numerous information handling systems can provide a global policy via a single point without having to access each IHS on an individual basis.

During operation, traffic analyzer and report module 204 may sample network traffic of first NIC 214, second NIC 216, and $n^{th}$ NIC 218 to detect one or more repeated patterns within the network traffic. Upon detecting one or more patterns, traffic analyzer and report module 204 can further monitor the network traffic over a period of time (e.g., 5 seconds, 30 seconds, 1 minute, 10 minutes, etc.) to detect a frequency of types of traffic communicated within the network traffic. Traffic analyzer and report module 204 may further analyze the network traffic and present different failover protection options based on a primary and alternative NIC capabilities of first NIC 214, second NIC 216, and $n^{th}$ NIC 218.

As such, a user can select a failover option based on the network traffic and establish or set the failover policy 208. In this manner, when fault detector 210 detects a failover event of one or more of the NICs, failover control module 212 may access the failover policy 208 and apply the policy and rules specified within the failover policy 208 to automatically provide failover support and enable communication of specific network traffic detected in the failover policy 208. Additionally, the failover event and applied policy may be stored within failover report module 206, and a user, application, etc. can access the failover report that identifies traffic that has been failed over. Failover report module 206 may further store alternative failover suggestions using the failover policy 208 to assist with a failback and recovery plan.

When failover management system 200 is implemented within CPU or host processor 102, it usually requires that at least a single, dual-port Ethernet controller be used. Particularly, a single Ethernet controller is coupled to two NICs or Lan-On-Board (LOM) ports or devices—which are treated interchangeably in certain embodiments. At the outset, it is noted that a conventional fault-tolerant system does not offer failover capabilities for Ethernet controller failures. That is, if the CPU's Ethernet controller fails, both ports are rendered inoperative. Furthermore, the need for a dedicated second port in the form of a standby or redundant NIC or LOM for the failover path presents extra hardware cost burdens for customers, which are significant, for example, when large data centers with hundreds of IHSs are deployed.

Accordingly, in various embodiments, the systems and methods described herein do not require that a second, additional, standby, or redundant NIC or LOM be dedicated to host processor 102 for failover or fault tolerance purposes (e.g., in case the primary NIC fails, its configuration changes, temporary maintenance is required, or network cables are reconfigured).

Rather, existing but unused Media Access Control (MAC) addresses provided by BMC 128 are used to create a failover path for host network traffic. A switching device including a Field Programmable Gate Array (FPGA) may be used, for example, for monitoring failover situations and for switching host network traffic from a dedicated controller and/or port to BMC 128's controller or port. In case CPU 102's Ethernet Controller fails (e.g., due to wrong configuration, firmware corruption, fault in MAC/PHY layer, or NO link status for uplink/downlink, etc.), BMC 128 may provide the redundant network data path.

Figure 3:
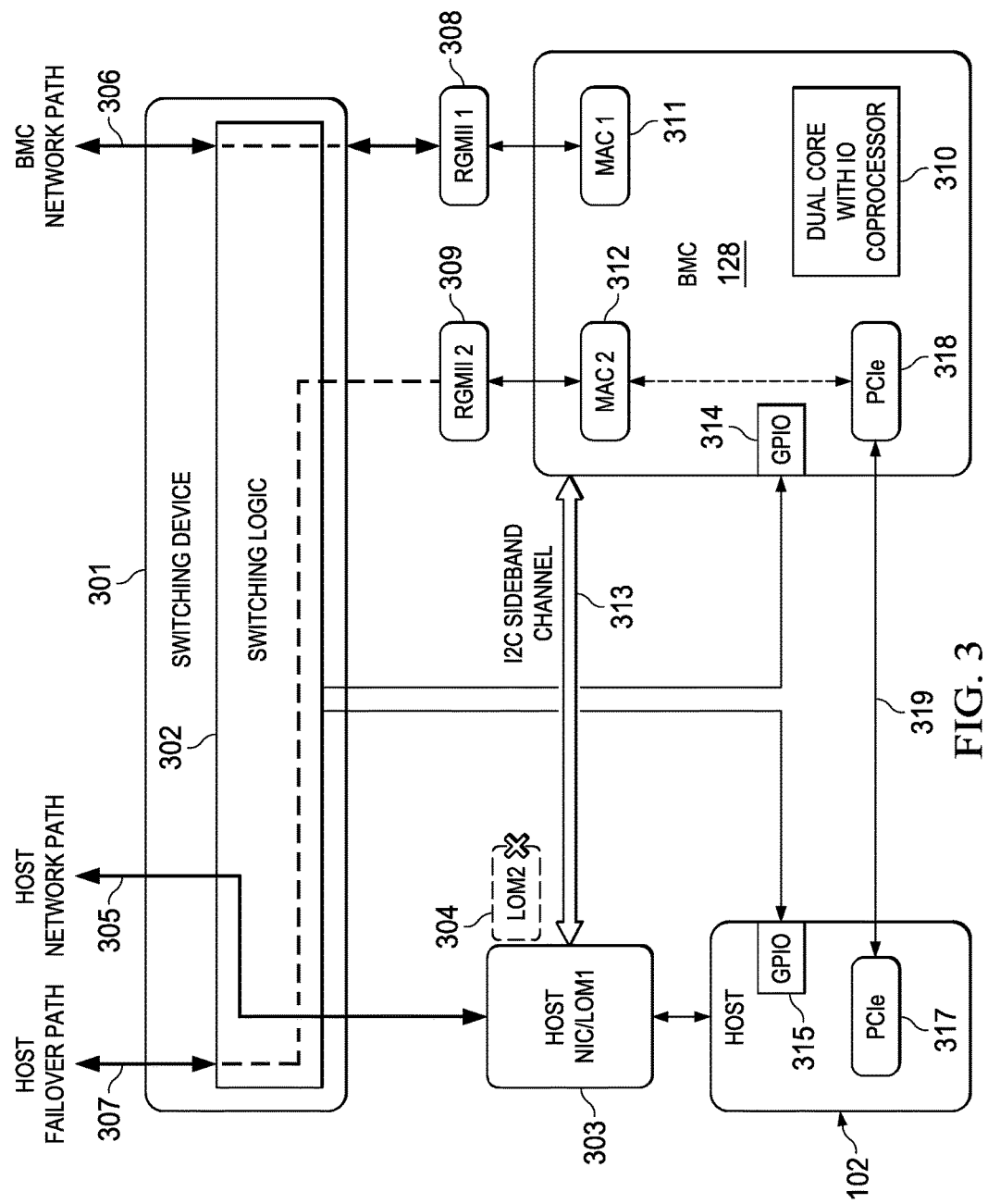
FIG. 3 is a block diagram of an example of a host processor dedicated network traffic failover system, according to some embodiments.

FIG. 3 is a block diagram of an example of a host processor dedicated network traffic failover system according to some embodiments. Specifically, the system comprises CPU or host processor 102, BMC 128, and switching device 301, which includes switching logic 302. Host NIC or LOM1 303 is coupled between switching device 301 and host processor 102, and it enables host network traffic 305 (e.g., packets, etc.) to flow between host processor 102 and a network. Ordinarily, a secondary or standby LOM2 304 would have to be provided for failover purposes, but, using the systems described herein, LOM2 304 may be omitted altogether (represented here with an "X" to indicate its absence).

BMC 128 includes a dual core co-processor with I/O capabilities, as well as two MAC ports 311 and 312 coupled to two corresponding Reduced Gigabit Media-Independent Interface (RGMII) blocks 308 and 309, respectively. Ordinarily, both MACs 311 and 312 would be dedicated to BMC 128. Here, however, BMC network path 306 is provided via RGMII 308 and MAC1 311, and host failover path 307 is provided via RGMII 309 and MAC2 312.

Host NIC/LOM1 303 is coupled to BMC 128 via Inter-Integrated Circuit ($I^2C$) bus or channel 313 to allow configuration information to be exchanged between NIC/LOM1 303 and MAC2 312, for example. Switching device 301 is also coupled to GPIO port 314 of BMC 128 and to GPIO port 315 of host processor 102 to facilitate switching operations. PCIe endpoint 317 of host processor 102 is coupled to PCIe endpoint 318 of BMC 128 to enable transfer of host failover traffic 307 between BMC 128 and host processor 102.

In case of host NIC, BMC control (configuration path) is had over the $I^2C$ bus, and the data path is over RMII (NCSI). In case of LOM, BMC control (configuration path) is also over $I^2C$, and the data path is RMII (NCSI).

In operation, host network traffic 305 carries network packets to and from host processor 102, and BMC network path 306 carries network packets to and from BMC 128. Moreover, an already existing standby or redundant MAC port (e.g., MAC 312) of BMC 128 may be used to conduct host failover traffic 307 between the network and host processor 102 via BMC 128 over PCIe bus 319, for example, in response to a determination by switching device 301 that host network path 305 has failed or is otherwise impaired (e.g., Host NIC/LOM1 303 is having problems, etc.), as determined by failover management system 200 of FIG. 2, which in this embodiment is executed by host processor 102. Because BMC 128 already has a redundant MAC built in—which now may be used to carry host processor failover traffic—LOM2 304 may be eliminated from host processor 102.

In some embodiments, stand-by Ethernet MAC2 312 may be made to have the configuration as that of the Host NIC/LOM1 303. For example, BMC 128 may periodically poll NIC/LOM1 303 for configuration information to be applied to MAC2 312 via $I^2C$ bus 313. Additionally or alternatively, BMC 128 may receive such configuration information upon detection of a change or upon switching device 301's detection of a failover condition in host network traffic path 305.

During failure of Host NIC/LOM1 303, MAC2 312 of BMC 128 takes charge host failover traffic 307 after receiving a GPIO trigger from switching device 301. This is routed to host processor 102 via PCIe bus 319. Similarly another GPIO signal sent by switching device 301 to host processor 102 triggers the switching of host network path 305 to host failover path 307 using PCIe endpoint 317.

The failover or stand-by MAC 312 has a similar configuration to that of the active NIC 303, apart from the IP and MAC addresses. Accordingly, in some cases, failover MAC 312 may be initially assigned a virtual MAC and IP address.

In general, an active/standby failover system allows a user to use a standby security appliance to take over the functionality of a failed unit. When the active unit fails, it changes to the standby state while the standby unit changes to the active state. The unit that becomes active assumes the IP addresses (or, for transparent firewall, the management IP address) and MAC addresses of the failed unit and begins passing traffic. The unit that is now in standby state takes over the standby IP addresses and MAC addresses (Virtual MAC and IP). Because network devices see no change in the MAC to IP address pairing, no ARP entries change or time out anywhere on the network.

Configuration parameters of the NIC/LOM1 303 such as Link Speed, MTU, VLAN parameters, auto-negotiation, and DNS parameters, are restored to the MAC 312 during failover. A command (e.g., "racadm nicinfo") may be used to get all configuration of NIC/LOM1 303 apart from IP address and MAC. This configuration may be stored in flash within BMC 128.

In some embodiments, switching device 301 may be deployed as a dual-switch with an FPGA implementing switching logic 302, such that the FPGA may have connectivity to both the logical isolated switches. The FPGA may be exclusive of an Ethernet controller, and it may not use fabric-level switching logic, but only port-level switching. For example, switching logic 302 may be implemented as a complex programmable logic device (CPLD). The signaling hardware logic of switching device 301 may be completely isolated, such that a failure of a logical isolated switch does not affect the other isolated logical switch. In some cases, the FPGA may include minimal network IP core to create private virtual LAN (VLAN) between host 102 and BMC 128.

In case of uplink cable, downlink cables, or controller configuration problems, or logical switch failure, the redundant failover path 307 may be executed with the logically isolated switch. Depending upon the failover configuration selected by the user, the FPGA may monitor host network traffic 305 or BMC (management) network traffic 306. Moreover, conversion logic may transform higher data rate traffic to lower data rate traffic for environments restricted to 1 Gig Ethernet networks, so that no extra cables are needed for conversion.

In some embodiments, failover detection may be probed by multicasting or broadcasting "keep alive" packets in the private VLAN network. Internal "keep alive" packets in VLAN network do not flood the external network, and may be sent every 1 second, for instance, to check the link status of NIC/LOM of both host 102 and BMC 128. This time interval may be be varied between 1 and 3 seconds, depending upon the desired detection speed.

After identifying the failure of "keep alive" responses from host 102, the data path to and from the host may be switched from host network path 305 to host failover path 307. The FPGA may interrupt host 102 and BCM 128 to enable the fast PCIe data path. Once the detected failure is recovered, as identified by the "keep alive" responses, the network data path to and from the host may be returned from host failover path 307 to host network path 305.

In the embodiment of FIG. 3, switching device 301 is not involved in the monitoring and detection of failover, but rather only the switching logic is implemented in the FPGA. That is, host processor 102 monitors link status and activity, and interrupts the FPGA during a failure. In other embodiments, however, switching device 301 may implement at least a portion of failover management system 200, and it may perform the monitoring and detection of failover, as well as the switching operations. In those cases, the failover logic may provide network connectivity through BMC 128 even if the host processor's 102 Ethernet controller fails (e.g., all ports down), because monitoring and switching by independent FPGA, it causes no load on host 102 or BMC 128).

In many cases, the data path may be immediately switched back to the host network controller 303 once connectivity is up, and BMC 128 may be only used during a short period of time. For example, BMC 128 may already have separate co-processor 310 for I/O transitions, so there is no performance impairment with respect to BMC 128.

Figure 4:
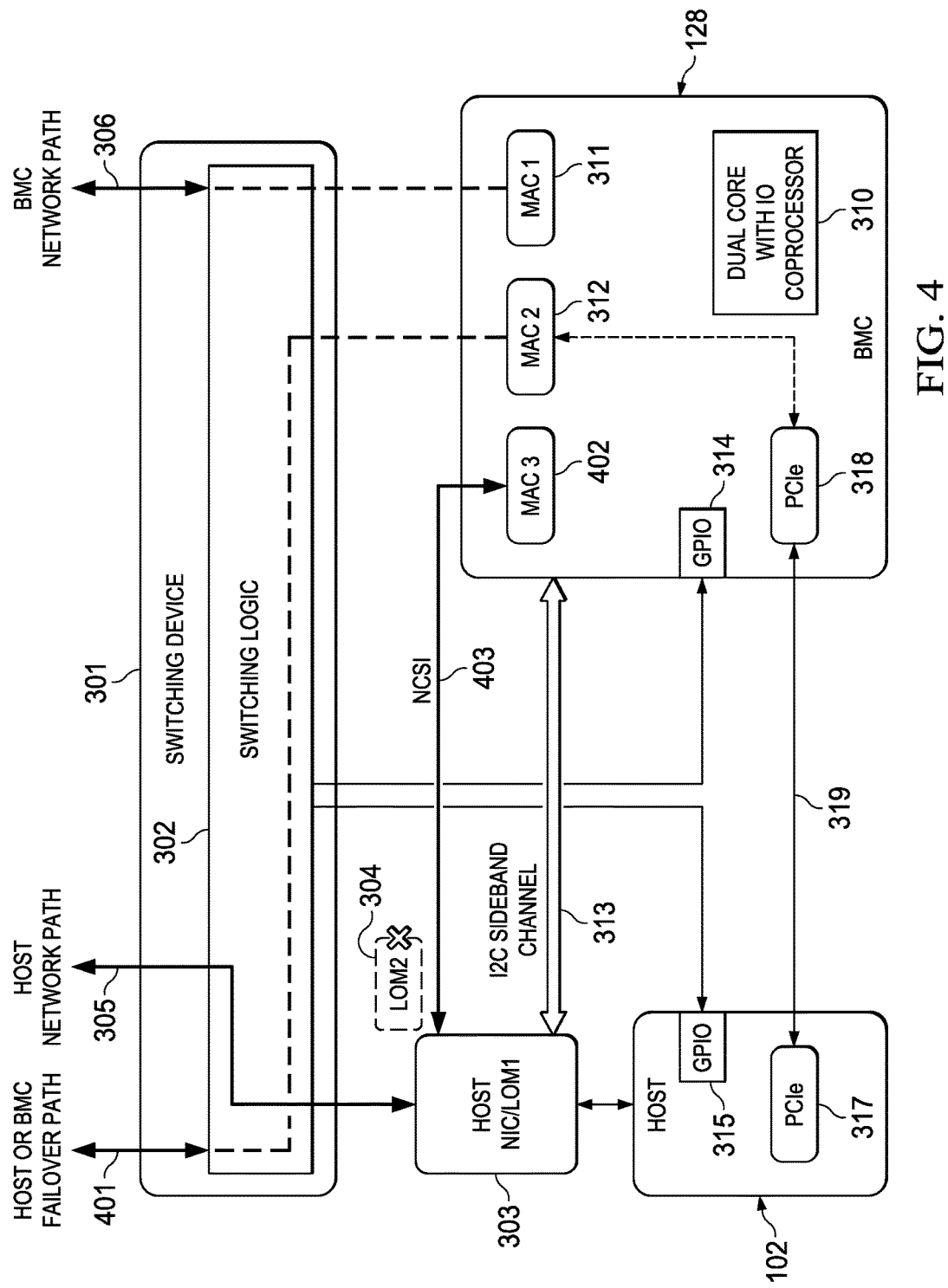
FIG. 4 is a block diagram of an example of a host processor and Baseboard Management Controller (BMC) shared network traffic failover system, according to some embodiments.

FIG. 4 is a block diagram of an example of a host processor and Baseboard Management Controller (BMC) shared network traffic failover system. In this embodiment, failover path 401 may be used for either host processor 102 or BMC 128 failover traffic. That is, in addition to a host processor failover network path, the same infrastructure also provides a BMC network failover path.

Particularly, a MAC2 312 within BMC 128, which would otherwise be dedicated to BMC 128, is instead shared for purposes of failover traffic. Moreover, MAC3 402 may be coupled to NIC/LOM1 303 via Network Controller Sideband Interface (NCSI) bus 403, which may be used made to mimic the configuration as that of NIC/LOM1 303.

In some cases, the embodiments of FIGS. 3 and 4 may be selected by a user as shown in Table I below:

TABLE I

| Configuration | Auto-Dedicated | BMC Mode | Failover Solution |
|---|---|---|---|
| 1 - host failover | Disabled | Shared mode = 0 | In this case, NIC/LOM1 303 Fails. MAC2 312 becomes the host failover path 307 and MAC1 311 becomes the BMC failover path 306. |
| 1 - host failover | Enabled | Shared mode = 1 | MAC2 312 becomes the host failover path 307 and MAC1 311 is switched to a dedicated mode for BMC management traffic. |
| 2 - BMC failover | Disabled | Shared mode = 0 | Not Supported |
| 2 - BMC failover | Enabled | Shared mode = 1 | BMC failover is supported. MAC2 312 takes charge of BMC Network Traffic 401. |

Figure 5:
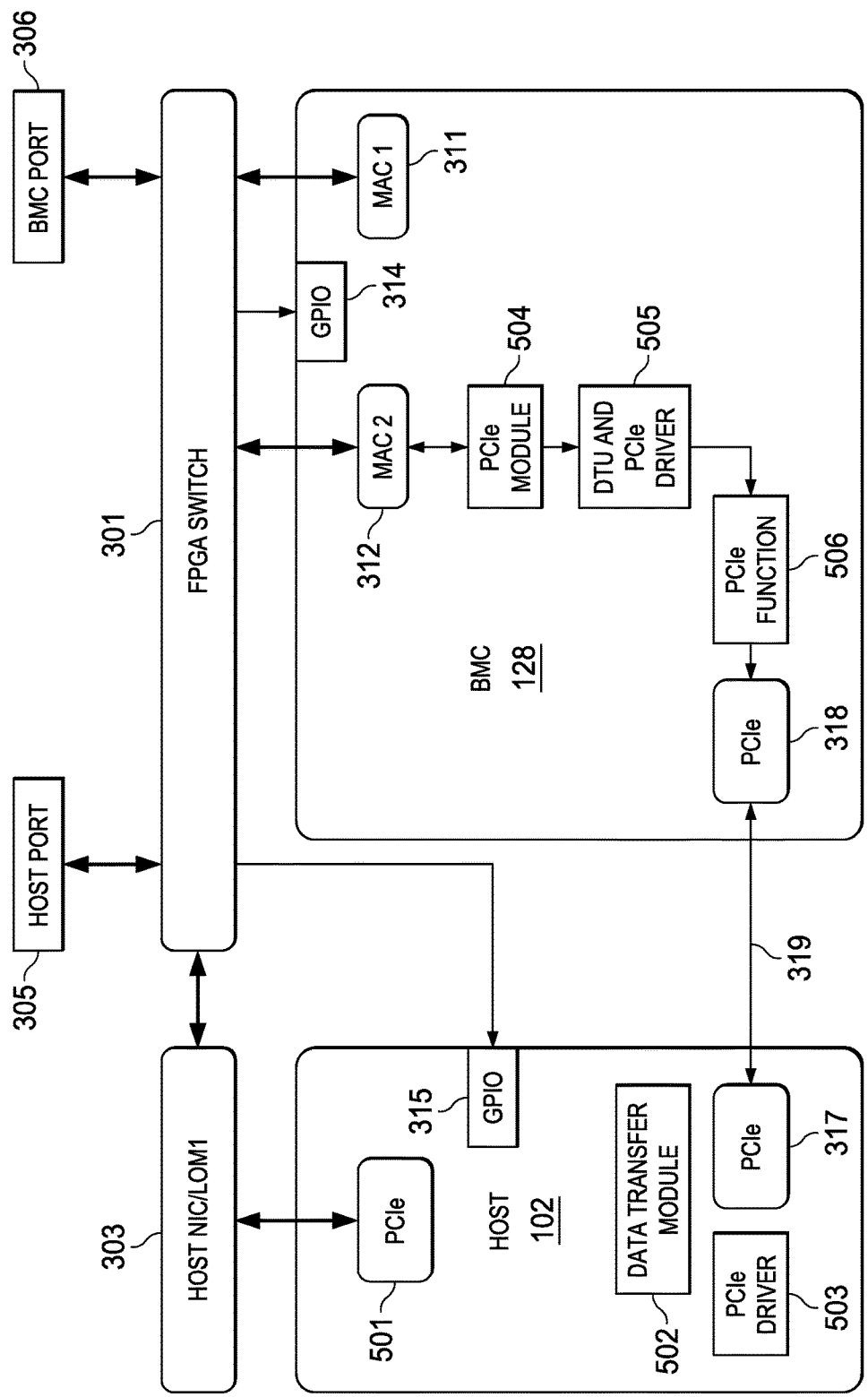
FIG. 5 is a block diagram of an example of a Peripheral Component Interconnect Express (PCIe) system, according to some embodiments.

In various implementations, BMC 128 may use PCIe bus 319 for its main host interface in order to transmit network traffic to and from host processor 102. In that regard, FIG. 5 is a block diagram of an example of a Peripheral Component Interconnect Express (PCIe) system. On the BMC side, BMC 128 includes a PCIe interface controller configured to provide access to a PCIe channel. PCIe module 504 is coupled to MAC2 312 and to Data Transfer Unit (DTU) and PCIe driver 505, the DTU being configured to access the PCIe channel through PCIe controller 312 and registered as a PCIe function 506. DTU 505 is configured to establish a data transfer channel between the DTU and PCIe endpoint 317 of host 102 over PCIe link 319. On the host side, PCIe endpoint 317 is coupled to PCIe driver 503 and DTU 502, as well as to PCIe port 501.

In some embodiments, multipath software layers may leverage the redundant paths to provide performance-enhancing features, including dynamic load balancing, automatic path management, and dynamic reconfiguration.

In sum, in various embodiments, the systems and methods described herein enable the fast switching of host network traffic 305 to BMC 128 with FPGA switch 301, which is responsible for monitoring failover path and to switch traffic to pre-configured BMC MAC as similar to host 102's NIC/LOM1 configuration. Except for the addition of the FPGA, no extra hardware is involved. Also BMC port failover is provided along with host port failover. Along with failover or fault tolerance, the additional BMC path can be used for regular load sharing during peak loads, although BMC performance may not impacted because traffic may be handled by co-processor 310.

Because BMC 128 periodically obtains the configuration of NIC/LOM1 303 through $I^2C$ sideband channel 313, no configuration is needed during failover switching. BMC 128 may work as a virtual NIC for host processor 102, with very minimal changes in host 102, for change of network data path from native PCIe path (305) to a virtual NIC PCIe path (307).

In the above described flowcharts, one or more of the methods may be embodied in a memory device or computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by a person of ordinary skill in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a host processor having a host-dedicated network path;
a single Baseband Management Controller (BMC) coupled to the host processor, wherein the single BMC comprises: a BMC network path between the single BMC and a network external to the IHS, and a BMC network failover path between the single BMC and the network external to the IHS, wherein the single BMC is configured to receive network configuration data via a sideband channel upon detection of a configuration change or upon request; and a memory coupled to the host processor, the memory having program instructions stored thereon that, upon execution, cause the IHS to:

determine that the host-dedicated network path has failed, at least in part, by determining that an Ethernet controller has failed; and route host network traffic to and from the host processor through the BMC network failover path.

2. The IHS of claim 1, wherein the network device that includes a Network Interface Card (NIC) or a Local Area Network (LAN)-on-Motherboard (LOM) device coupled to the host processor.

3. The IHS of claim 1, wherein the BMC network failover path includes a secondary Reduced Gigabit Media-Independent Interface (RGMII).

4. The IHS of claim 1, wherein the BMC network failover path includes a standby Ethernet Media Access Control (MAC) address.

5. The IHS of claim 1, wherein the switching device is distinct from the host processor and the single BMC.

6. The IHS of claim 5, wherein the switching device includes a Field-Programmable Gate Array (FPGA) coupled to the host processor and to the BMC via a General-Purpose Input/Output (GPIO) port.

7. The IHS of claim 6, wherein the single BMC is configured to take charge of the host network traffic after receiving a GPIO trigger from the FPGA.

8. The IHS of claim 1, wherein the single BMC is configured to transfer host network traffic between the host processor and the BMC network failover path via a Peripheral Component Interconnect Express (PCIe) bus.

9. The IHS of claim 8, wherein the host processor is configured to use a PCIe endpoint instead of the host-dedicated network port after receiving another GPIO trigger from the FPGA.

10. The IHS of claim 9, wherein the program instructions, upon execution, cause the IHS to:

determine that the BMC network path has failed; and route BMC management network traffic to and from the single BMC concurrently with the host network traffic through the BMC network failover path, at least in part, under control of a switching device distinct from the single BMC.

11. In an Information Handling System (IHS) having a host processor, a memory having program instructions stored thereon, a single Baseband Management Controller (BMC) coupled to the host processor, and a Field-Programmable Gate Array (FPGA) coupled to the host processor and to the single BMC, a method comprising:

determining, by the FPGA, that a host-dedicated network path between the host processor and a network external to the IHS has failed, at least in part, by determining that an Ethernet controller has failed;

routing host network traffic to and from the host processor through a BMC network failover path of the single BMC, wherein the BMC network failover path is between the single BMC and the network external to the IHS;

determining that a BMC network path of the single BMC has failed, wherein the BMC network path is between the single BMC and the network external to the IHS, wherein the single BMC is configured to receive network configuration data via a sideband channel upon detection of a configuration change or upon request; and routing management network traffic to and from the single BMC concurrently with the host network traffic through the BMC network failover path, at least in part, under control of a switching device distinct from the single BMC.

12. The method of claim 11, wherein the single BMC is configured to take charge of the host-dedicated network traffic after receiving a GPIO trigger from the FPGA, and wherein the host processor is configured to use a Peripheral Component Interconnect Express (PCIe) endpoint instead of a dedicated network port after receiving another GPIO trigger from the FPGA.

13. The method of claim 11, wherein the single BMC is configured to transfer host network traffic between the host processor and the BMC network failover path via a PCIe bus.

14. A memory device having program instructions stored thereon that, upon execution by an Information Handling System (IHS) having a single Baseband Management Controller (BMC) and a Field-Programmable Gate Array (FPGA) coupled thereto, cause the IHS to:

determine, by the FPGA, that a host-dedicated network path between the host processor and a network external to the IHS has failed, at least in part, by determining that an Ethernet controller has failed;

route host network traffic to and from the host processor through a BMC network failover path of the single BMC, wherein the BMC network failover path is between the single BMC and the network external to the IHS;

determine that a BMC network path of the single BMC has failed, wherein the BMC network path is between the single BMC and the network external to the IHS, wherein the single BMC is configured to receive network configuration data via a sideband channel upon detection of a configuration change or upon request; and route management network traffic to and from the single BMC concurrently with the host network traffic through the BMC network failover path, at least in part, under control of a switching device distinct from the single BMC.

15. The memory device of claim 14, wherein the single BMC is configured to take charge of the host-dedicated network traffic after receiving a GPIO trigger from the FPGA, and wherein the host processor is configured to use a Peripheral Component Interconnect Express (PCIe) endpoint instead of a dedicated network port after receiving another GPIO trigger from the FPGA.

16. The memory device of claim 14, wherein the single BMC is configured to transfer host network traffic between the host processor and the BMC network failover path via a PCIe bus.

* * * * *